Feb. 12, 1946.   D. B. McRAE   2,394,930
FORMATION OF MIRRORS BY THERMAL EVAPORATION
Filed July 3, 1943

DANIEL B. McRAE
INVENTOR
BY
ATTORNEYS

Patented Feb. 12, 1946

2,394,930

UNITED STATES PATENT OFFICE 2,394,930

FORMATION OF MIRRORS BY THERMAL EVAPORATION

Daniel B. McRae, Rochester, N. Y., assignor to Eastman Kodak Company, Rochester, N. Y., a corporation of New Jersey Application July 3, 1943, Serial No. 493,433

2 Claims. (Cl. 117—35)

The present invention relates to the formation of mirrors, and more particularly to the formation of first surface reflective coatings for mirrors by thermal evaporation.

The formation of such first surface reflecting or mirror surfaces on glass by the deposition of a layer of aluminum evaporated in a vacuum is well known. A number of experts have claimed the need of placing a layer of chromium on the glass before putting on the aluminum. A number of advantages are claimed for this procedure, among which are superior hardening, resistance to chemical attack and freedom from pinholes, as compared to the results when evaporating aluminum on glass without the undercoating of chromium.

We have found that the presence of pinholes is one of the greatest drawbacks to the use of a single aluminum layer. We have also found that such a layer need not be inferior in hardness to one which has a chromium undercoat, and there are many applications in which resistance to damaging chemicals, such as salt spray, is relatively unimportant.

Difficulty has been experienced in getting a layer of aluminum which is free from pinholes. No matter how carefully one works, two or three minute specks of dust are sure to settle on the glass surface, either before or after it is placed in a bell jar. When the coating is made, the places protected by the dust specks will be free from aluminum, and will appear as pinholes in the coating.

It has been found that these pinholes can be almost entirely eliminated by first applying a layer of aluminum in the usual manner, then removing the coated glass and washing it under the cold water tap and rubbing with a cloth, then replacing the bell jar and applying the second layer, and finally removing and again washing and rubbing and drying. Pinholes caused by dust specks occur in each layer, but the probability of coincidence is very small. In fact, this type of first surface double coating has been done with the atmosphere quite dusty and a single aluminum layer looks like a sieve, whereas the combination or double layer shows no holes. The layer of aluminum oxide formed during the first washing serves as a barrier between the two aluminum layers and helps prevent the second layer from continuing the imperfections of the first layer. It also helps to keep the film or layer hard, whereas a single layer of aluminum of twice the ordinary thickness may show some tendency towards softness and towards the development of cracks, frills, etc.

The present invention has, therefore, as its principal object the provision of a mirror formed with a reflecting surface substantially free from pinholes or uncoated portions.

A further object of the invention is the provision of such a reflecting surface which is hard and tough.

To these and other ends, the invention resides in certain improvements and combinations of parts all as will be hereinafter more fully described, the novel features being pointed out in the claims at the end of the specification.

Figure 3:
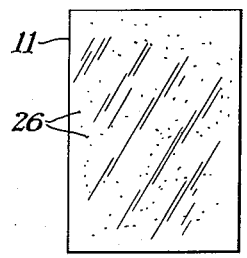
Fig. 3 is a view of the plate glass after the application of the first layer, showing the presence of pinholes.
Figure 4:
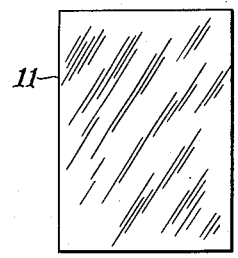
Fig. 4 is a view similar to Fig. 3 showing the final double-coated glass layer from which the pinholes have been eliminated.
Figure 2:
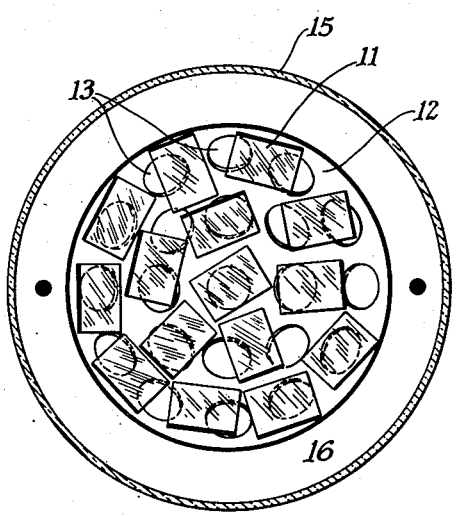
Fig. 2 is a vertical sectional view taken substantially on line 2—2 of Fig. 1, showing the glass plates in position for coating.

The glass plates 11 to be coated may be best of the shape best shown in Figs. 3 and 4. Prior to the coating, these glass plates are thoroughly cleaned by dipping the plates in a solution of soap and water and rubbing with a clean cloth until the plates show no scum or grease when held in a light beam, such as that projected by a lantern slide projector. After the plates have been rubbed clean, they are laid loosely in a spherical shell arrangement 12 formed with a plurality of apertures 13, the purpose of which will be later pointed out. The clean plates are arranged on the shell 12 so that a line from the center of the evaporating filament 14 to the center of the shell 12 will be approximately normal to the latter. After the plates have been thus arranged, as shown in Fig. 2, a bell jar 15 is placed over the shell to provide a vacuum chamber 16 in which a thermal evaporation is carried on. The bell jar is then sealed in the usual and well-known manner.

Figure 1:
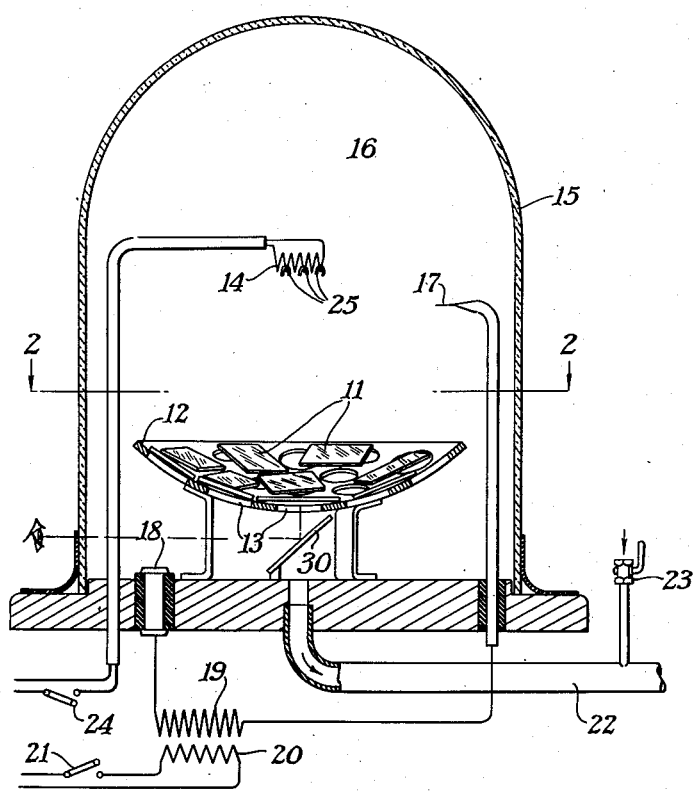
Fig. 1 is a sectional elevational view through the vacuum chamber, showing the relation thereto of the glass plates to be coated with a reflecting material by thermal evaporations of a reflecting metal, such as aluminum.

Prior to the coating of the reflecting material, such as aluminum, on the front face of the glass plates 11, the latter have the occluded gases removed therefrom and the surfaces prepared for coating by applying energy thereto. This applied energy may, for example, be in the form of a glow discharge between the electrodes 17 and 18 which are connected to the secondary 19 of a transformer, the primary 20 of which is, in turn, connected to a source of power not shown. A suitable switch 21 may be connected into the circuit of the primary 20, as shown in Fig. 1. Prior to the operation of the glow discharge, the chamber 16 is first evacuated through a pipe 22 connected to a suitable vacuum pump, not shown, to lower the pressure in the chamber 16 to a point at which a good electrical discharge can be maintained. This pressure is in the neighborhood of 0.10 mm. of mercury. At this time the switch 21 is then closed and the glow discharge is started, the voltage of the discharge being about 25,000 volts. A glow discharge current of 0.04 ampere is maintained from 12 to 15 minutes during which time the ionic bombardment of the glass plates 11 removes the final traces of grease and absorbs gases and water vapor from the glass surfaces so that the evaporated metal, such as aluminum, will adhere more tenaciously to the surfaces of the glass plates to be coated.

The best pressure for the glow discharge will vary somewhat with the size of the bell jar and the resulting free path of the molecules contained therein, and will also be dependent upon the gas which is in the bell jar. With bell jars of 18 inches in diameter containing air, the best glow is obtained at about 0.15 mm. of mercury pressure. If, however, the pressure is simply reduced to this value and the discharge started, the pressure being maintained by means of the valve 23 which provides a slow adjustable leak, strange appearing spots are formed on the surfaces of the glass plates 11. It has been found that these spots can be avoided by the following procedure: The pressure is first pumped down so that very little discharge current can pass. This pressure is about 0.10 mm. of mercury. The discharge is then started and the valve 23 is opened slightly to admit a slight leakage of air into the chamber 16 and this condition is maintained during the glow discharge which lasts 12 to 15 minutes. During the discharge the pressure is raised to and maintained at 0.15 mm. of mercury.

After the glass plates have been cleaned by the glow discharge, the discharge is discontinued by opening the switch 21. A diffusion vacuum pump is then started and when the pressure in the vacuum chamber 16 is at least as low as 0.0005 mm. of mercury, the filament 14 is heated by closing a switch 24. The heating of the filament first melts and then evaporates the bent aluminum pieces 25 hung on the filament 14, as shown in Fig. 1. The aluminum vapor condenses on the upper or front surfaces of the prepared glass plates 11 as is well known. When the deposit on the plate has been judged to be adequate, by observing the dimming of a light source seen through the plates from below and through the aperture 13 of the shell 12 by means of the mirror 30, the evaporation is terminated by opening the switch 24. Usually only a portion of the aluminum pieces 25 is used up in one evaporation.

The vacuum in the chamber 16 is then broken to allow the air to contact the freshly coated surfaces of the plates 11, such contact serving to oxidize the coating. When the plates with the oxidized coating are removed from the bell jar, the coating is rough to the touch and is easily scratched. This oxidized coating is then hardened and toughened by holding each plate 11 under a stream of cold tap water and rubbing with a cloth, at first gently and then more vigorously. This treatment appears to burnish down slight irregularities on the surface and results in a hard, smooth surface which is quite resistant to scratches.

If there had been a speck of dust on the glass during the time it was being coated with aluminum, the glass will remain uncoated at that spot, and the pinhole 26 will appear, as shown in Fig. 3, when the dust speck is removed by the burnishing. Sometimes there are so many such pinholes that the mirror does not have a good appearance.

It has been found that the pinholes can be almost entirely eliminated by putting a second layer of aluminum on top of the first burnished oxidized layer. If burnishing is not done between coatings, the dust specks remain in their original positions, for the most part, so that these portions of the glass still remain uncoated and the pinholes are practically as bad as with a single coating. The burnishing either removes the dust specks from the first layer, or else moves them to new positions. Thus, when the second layer is applied, the probability that any of the original dust specks, or even any new ones, are occupying the old positions is quite low. As a result, each layer may contain a number of pinholes, but they do not coincide so that the final mirror appears completely opaque, as shown in Fig. 4.

After all the glass plates 11 have been burnished, as above described, they are again replaced in position on the shell 12, and the bell jar 15 is returned to position, as shown in Fig. 1, in preparation for the application of the second coating of aluminum on the glass plates. The chamber 16 is again evacuated and the coated plates are again subjected to a glow discharge, in the manner above described. At the completion of the glow discharge, the chamber 16 is further evacuated and the filament 14 energized to evaporate the aluminum pieces 25 so as to deposit a second coating or layer of aluminum in the plates 11. As it is desirable to have the second coat or layer of aluminum of about the same thickness as the first coating, a small uncoated piece of glass, not shown, is placed in the vacuum chamber 16 each time an additional coating is applied. The progress of the coating can be observed on this pilot glass. After such a second coating is completed, the vacuum is again broken to permit the air to contact the second coating to oxidize the latter. After this second coating, the second oxidized layer is then burnished with water and rubbing to give a hard, durable, smooth, opaque first surface reflecting coat.

By means of the above method, a mirror comprising a pair of burnished oxidized coatings is provided. This double coating effectively eliminates pinholes to provide the desired continuous and unbroken first surface reflecting coating, as shown in Fig. 4. The layer of aluminum oxide formed during the washing of the first coating serves as a barrier between the two aluminum layers and helps to prevent the second layer from containing the imperfection of the first layer. This double coating also helps to keep the film hard, whereas a single layer of aluminum of twice the ordinary thickness may show some tendency toward softness, and toward the development of cracks, frills, etc. While only the application of two such layers has been described, it is obvious that a greater number may be applied in the same manner. It has been found, however, that two such coatings are quite adequate for the purpose.

While only one method of forming such layers has been described, it is to be understood that the inventive idea may be carried out in a number of ways. This application is, therefore, not to be limited to the precise details described but is intended to cover all variations and modifications falling within the scope of the appended claims.

I claim:

1. The method of forming a reflective coating on a surface of a glass plate comprising initially cleaning the surface to be coated, placing the plate in a chamber, evacuating said chamber removing occluded gases from and preparing said surface for coating by applying a glow discharge thereto, depositing by thermal evaporation a layer of aluminum upon said surface while in said vacuum, breaking said vacuum to allow the air to contact said layer to oxidize the latter, removing said plate from said chamber, hardening and toughening said oxidized layer by rubbing with cold water and a cloth, replacing said surface in said chamber, reforming said vacuum, depositing by thermal evaporation a second layer of aluminum upon said oxidizel layer, breaking the vacuum to allow the air to contact said second deposited layer to oxidize the latter, and then hardening and toughening said second oxidized layer by again rubbing with cold water and a cloth.

2. The method of forming a reflective coating on a surface of a glass base comprising initially cleaning the surface to be coated, placing the base in a chamber, evacuating said chamber, depositing by thermal evaporation a layer of aluminum upon said surface while in said vacuum, breaking said vacuum to allow the air to contact said layer to oxidize the latter, removing said base from said chamber, hardening and toughening said oxidized layer by burnishing with cold water and rubbing with a cloth, replacing said surface in said chamber, reforming said vacuum, depositing by thermal evaporation a layer of aluminum upon said oxidized layer, breaking the vacuum to allow the air to contact said second deposited layer to oxidize the latter, and then hardening and toughening said second oxidized layer by burnishing with cold water and rubbing with a cloth.

DANIEL B. McRAE.